US012050420B2

(12) United States Patent
Mitsuda

(10) Patent No.: US 12,050,420 B2
(45) Date of Patent: Jul. 30, 2024

(54) IMAGE FORMING SYSTEM THAT DETECTS CHARACTERISTICS OF RECORDING MATERIAL

(71) Applicant: Konica Minolta, Inc., Tokyo (JP)

(72) Inventor: Ryo Mitsuda, Sagamihara (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/837,030

(22) Filed: Jun. 10, 2022

(65) Prior Publication Data

US 2022/0397846 A1 Dec. 15, 2022

(30) Foreign Application Priority Data

Jun. 14, 2021 (JP) ................................ 2021-098697

(51) Int. Cl.
*G03G 15/20* (2006.01)

(52) U.S. Cl.
CPC .................................. *G03G 15/205* (2013.01)

(58) Field of Classification Search
CPC .................................................... G03G 15/205
See application file for complete search history.

(56) References Cited

U.S. PATENT DOCUMENTS

2011/0110675 A1 5/2011 Matsumoto
2017/0336748 A1* 11/2017 Maejima ............ G03G 15/6594

FOREIGN PATENT DOCUMENTS

CN 106019903 B * 10/2019 ............ B65H 20/02
JP 2017-138406 A 8/2017
JP 2019184656 A 10/2019

OTHER PUBLICATIONS

CN_106019903_B_I MachineTranslation, Oct. 2019, China, Yu et al.*
JP_2019184656_A_I Machine Translation, Kanehara, Japan, Apr. 2018.*
Extended European search report issued in corresponding European Patent Application No. 22177108.2 dated Nov. 4, 2022 (8 pages).

* cited by examiner

*Primary Examiner* — Victor Verbitsky
(74) *Attorney, Agent, or Firm* — Osha Bergman Watanabe & Burton LLP

(57) ABSTRACT

An image forming system includes: a conveyor that conveys a recording material along a conveyance path; a detector that is disposed on the conveyance path and detects a characteristic of the recording material; a fixer that fixes a toner image formed on the recording material; and a hardware processor that: causes the detector to detect the characteristic during a warm-up of the fixer with respect to an image forming job, and based on the characteristic, sets an image forming condition in the image forming job.

16 Claims, 8 Drawing Sheets

IMAGE FORMING SYSTEM THAT DETECTS CHARACTERISTICS OF RECORDING MATERIAL

CROSS-REFERENCE TO RELATED APPLICATIONS

The present application claims priority from Japanese patent Application No. 2021-098697, filed on Jun. 14, 2021, the contents of which are incorporated herein by reference in their entirety.

BACKGROUND

Technical Field

The present invention relates to an image forming system.

Description of Related Art

An image forming device irradiates a photoreceptor with laser light to form an electrostatic latent image, and develops the same with toner to form a toner image. The image forming device transfers the formed toner image to a recording material and thermally fixes the same to form an image on the recording material. The image forming device sets an image forming condition such as optimal fixing temperature and a conveyance speed of the recording material according to a recording material characteristic such as a thickness and a surface state of the recording material and a type of the recording material.

The recording material characteristic has been set by a user's operation via an operation unit provided in the image forming device or a print setting screen of a printer driver. Recently, an image forming device that detects a recording material characteristic using a built-in sensor (hereinafter, referred to as a "medium sensor") and automatically sets an image forming condition according to a detection result is proposed (refer to, for example, JP 2017-138406 A).

In the image forming device disclosed in JP 2017-138406 A mentioned above, the medium sensor is provided on a conveyance path from a sheet feeder of a recording material to a position at which a toner image is transferred. The recording material is conveyed to the position of the medium sensor where the recording material characteristic is detected. By detecting the recording material characteristic using the medium sensor, and performing image formation by setting a condition of each unit according to the detected recording material characteristic, setting of the recording material characteristic by a user becomes unnecessary, and convenience is enhanced.

Since it takes a predetermined time to correctly detect the characteristic of the recording material by the medium sensor, the conveyance of the recording material is stopped or a conveyance speed of the recording material is lowered, and the characteristic of the recording material is detected in a state in which a behavior of the recording material is stabilized.

In a normal image forming device, fixing target temperature according to a characteristic of a recording material is required, so that after the characteristic of the recording material is detected by a medium sensor, the fixing target temperature is determined according to a detection result. Therefore, a waiting time is generated until conveyance of the recording material is stopped and the detection of the recording material characteristic is completed, a start of printing including fixing is delayed, and productivity is lowered.

As in the image forming device disclosed in JP 2017-138406 A mentioned above, it is conceivable to start a fixing warm-up before the recording material characteristic is detected by the medium sensor using the recording material characteristic detected in the immediately preceding job and the corresponding fixing target temperature to reduce the waiting time. However, since the recording material used in a document job does not necessarily have the same characteristic as that of the immediately preceding job, this method cannot be applied to a case where the recording material is replaced or replenished, and deterioration in productivity cannot be suppressed.

SUMMARY

One or more embodiments of the present invention provide an image forming system capable of achieving both accuracy of detecting a characteristic of a recording material and productivity in a configuration in which a medium sensor detects the characteristic of the recording material, and an image forming device.

According to an aspect of the present invention, an image forming system comprises: a conveyor that conveys a recording material; a recording material characteristic detector (i.e., a detector) that is arranged (or disposed) on a conveyance path of the recording material and detects a recording material characteristic of the recording material; a fixer that fixes a toner image formed on the recording material; and a hardware processor that causes the recording material characteristic detector to detect the recording material characteristic while the fixer executes a warm-up on an image forming job, and sets an image forming condition in the image forming job on the basis of (or based on) the detected recording material characteristic.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.

Embodiments of Image Forming System

Hereinafter, an example of a mode for carrying out the present invention is described, but the present invention is not limited to the following example.

Figure 1:
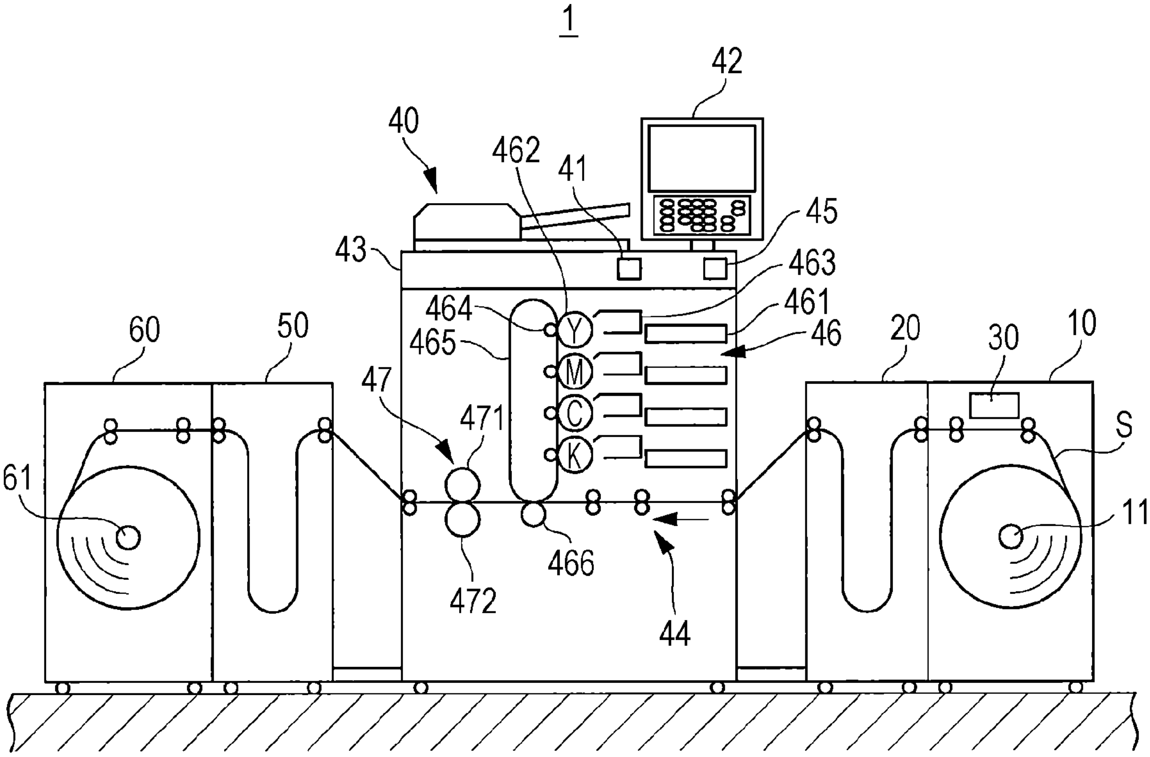
FIG. 1 is a view illustrating a schematic configuration of an image forming system.

FIG. 1 illustrates a schematic configuration of an image forming system. An image forming system 1 illustrated in FIG. 1 uses a roll-shaped recording material S that is continuous paper as a recording medium, and forms an image on the recording material S. The image forming system 1 is provided with a sheet feeding device 10, a medium detection device 30, an image forming device 40, and a recovery device 60 from an upstream side in a conveyance direction of the recording material S. In the image forming system 1 illustrated in FIG. 1, the medium detection device 30 is arranged in a housing of the sheet feeding device 10. The image forming system 1 is also provided with a supply adjuster (or feed adjuster) 20 between the sheet feeding device 10 and the image forming device 40, and a recovery adjuster 50 between the image forming device 40 and the recovery device 60.

The sheet feeding device 10 is provided with a sheet feeder including a support shaft 11 that rotatably holds the recording material S wound into a roll shape, and a conveyor 14 that conveys the recording material S wound around the support shaft 11 to the supply adjuster 20 at a constant speed by a plurality of rollers. A shape of the recording material S is not limited to the roll-shaped continuous paper. The recording material S is only required to have a shape having a length equal to or longer than a length from the medium detection device 30 to a fixer 47 of the image forming device 40. For example, a foldable shape or a shape of long paper may be applied as the shape of the recording material S. The sheet feeding device 10 is an example of a recording material supply device that supplies the recording material to the image forming device 40.

The supply adjuster 20 conveys the recording material S conveyed from the sheet feeding device 10 to an image former 46 of the image forming device 40. In order to absorb a speed difference between a feeding/conveyance speed of the recording material S from the sheet feeding device 10 and a conveyance speed of the recording material S in the image former 46, the supply adjuster 20 holds the recording material S in a loosen manner, and adjusts the feeding of the recording material S to the image former 46.

The medium detection device 30 is arranged on a conveyance path of the recording material S in the sheet feeding device 10. The medium detection device 30 includes a medium detector 33 (refer to FIG. 2) that detects a recording material characteristic of the recording material S conveyed from the sheet feeding device 10. The medium detector 33 detects the recording material characteristic of the recording material S at the time of condition setting of the recording material S when an image forming job is executed. The medium detection device 30 outputs detected detection information to the image forming device 40.

The medium detection device 30 is only required to be arranged upstream of the image former 46 of the image forming device 40 (not only in the sheet feeding device 10), and may be installed on the conveyance path of the recording material S, for example, in a housing of the supply adjuster 20, or between the supply adjuster 20 and the image forming device 40, or in a housing of the image forming device 40. The medium detection device 30 is an example of a recording material characteristic detection device that detects the characteristic of the recording material S. As the medium detection device 30, a conventionally known medium sensor capable of detecting the recording material characteristic of the recording material S may be applied. The medium detection device 30 detects, as the recording material characteristic, for example, a thickness and a surface state (smoothness) of the recording material S, a type (paper type), rigidity, a charge amount, a water content, a pattern (angle of a fiber direction of the recording material) of the recording material and the like.

The image forming device 40 is provided with a controller 41, an operation display unit 42, a scanner unit 43, a conveyor 44, an image processor 45, the image former 46, a fixer (or fixing device) 47 and the like. The image forming device 40 may also be provided with the above-described sheet feeding device 10 as a recording material feeder in the device of the image forming device 40. The image forming device 40 may also be provided with the above-described medium detection device 30 as a recording material characteristic detector in the device of the image forming device 40. In a configuration in which the image forming device 40 is provided with the recording material characteristic detector in the device, the recording material characteristic detector may be arranged on a recording material conveyance path between the sheet feeding device 10 (recording material feeder) and the image former 46.

The scanner unit 43 exposes and scans a document surface placed on a document table with a light source to receive reflected light from the document surface, photoelectrically converts the received reflected light with a charge coupled device (CCD) to generate image data, and outputs the same to the image processor 45.

The controller 41 comprehensively controls each configuration of the image forming system 1 and the image forming device 40. The image processor 45 performs image processing on the image data input from the scanner unit 43 or the controller 41, and outputs the same to the image former 46. Configurations of the controller 41 and the image processor 45 are described later in detail.

The operation display unit 42 formed of a liquid crystal display (LCD) and the like displays various operation buttons, a device state, an operation status of each function and the like on a display screen in response to an instruction of a display signal input from the controller 41. The display screen of the LCD is covered with a pressure-sensitive (resistive film pressure type) touch panel obtained by arranging transparent electrodes in a lattice manner, and detects XY coordinates of a force point pressed with a finger, a touch pen and the like as a voltage value and outputs a detected position signal to the controller 41 as an operation signal. The operation display unit 42 is also provided with various operation buttons such as numeric buttons and a start button, and outputs an operation signal by a button operation to the controller 41.

The image former 46 forms an image on the recording material S conveyed from the supply adjuster 20 by an electrophotographic method on the basis of the image data of each page input from the image processor 45. The image former 46 is provided with the recording material conveyance path on which a conveyance belt, a conveyance roller such as a registration roller, and a motor not illustrated that drives them are arranged, and forms an image on the recording material S while conveying the recording material S under the control of the controller 41.

The image former 46 is provided with four sets of exposure unit 461, photoreceptor 462, developer 463, and primary transfer roller 464 corresponding to respective color components of Y, M, C, and K, an intermediate transfer belt 465, and a secondary transfer roller 466. The four sets of exposure unit 461, photoreceptor 462, developer 463, and primary transfer roller 464 corresponding to the respective color components are arranged in order of Y, M, C, and K from the upstream.

The exposure unit 461 includes a laser light source, a polygon motor, a polygon mirror, a plurality of lenses and the like. The exposure unit 461 irradiates the charged photoreceptor 462 with laser light by a laser light source or a polygon mirror on the basis of a recording material conveyance speed to perform exposure, and forms an electrostatic latent image on the photoreceptor 462.

The developer 463 supplies toner of a predetermined color (Y, M, C, or K) on the exposed photoreceptor 462 and develops the electrostatic latent image formed on the photoreceptor 462.

The primary transfer roller 464 is provided so as to be opposed to the photoreceptor 462. The primary transfer roller 464 to which a primary transfer bias of polarity opposite to that of the toner is applied transfers (primarily transfers) the toner image formed on the photoreceptor 462 to the intermediate transfer belt 465 by pressing a predetermined position on the intermediate transfer belt 465 against the photoreceptor 462. The primary transfer rollers 464 of Y, M, C, and K sequentially press a predetermined position of the intermediate transfer belt 465 against the photoreceptor 462, so that a color toner image in which layers of respective colors are superimposed is written on the intermediate transfer belt 465.

The intermediate transfer belt 465 is a semiconductive endless belt suspended and rotatably supported by a plurality of rollers, is rotationally driven with rotation of the rollers, and conveys the written toner image to the secondary transfer roller 466.

The secondary transfer roller 466 to which a bias of polarity opposite to that of the toner is applied holds and conveys the conveyed recording material S to transfer (secondarily transfer) the color toner image written on the intermediate transfer belt 465 to the recording material S.

The fixer 47 heats and pressurizes the toner image transferred to the recording material S to fix the toner image on the recording material S. The fixer 47 is provided with a fixing roller 471 incorporating a halogen heater and the like, and a pressure roller 472 as a pressure member that presses the fixing roller 471 arranged at a position opposed to the fixing roller 471 with the recording material conveyance path interposed therebetween. The fixer 47 is also provided with a temperature sensor for detecting temperature of the fixing roller 471. The fixer 47 heats and pressurizes the toner image on the recording material S to fix while holding and conveying the recording material S on which the toner image is transferred at a nip unit formed between the fixing roller 471 and the pressure roller 472.

The fixer 47 also includes a position changing mechanism not illustrated that adjusts a position of the fixing roller 471 in order to adjust a nip pressure of the nip unit between the fixing roller 471 and the pressure roller 472, release a pressure contact and the like.

The recovery adjuster 50 is installed downstream of the image forming device 40 and upstream of the recovery device 60 in the conveyance direction of the recording material S. The recovery adjuster 50 is a device that conveys the recording material S conveyed from the image forming device 40 to the recovery device 60 and holds the recording material S in a loosen manner in order to absorb a speed difference between a conveyance speed of the recording material S in the image forming device 40 and a conveyance speed of the recording material S in the recovery device 60 and adjusts ejection of the recording material S from the image forming device 40.

The recovery device 60 is provided with a sheet ejector that winds the recording material S conveyed from the recovery adjuster 50 by a support shaft 61 at a constant speed via a plurality of rollers.

[Configuration of Image Forming System]

Figure 2:
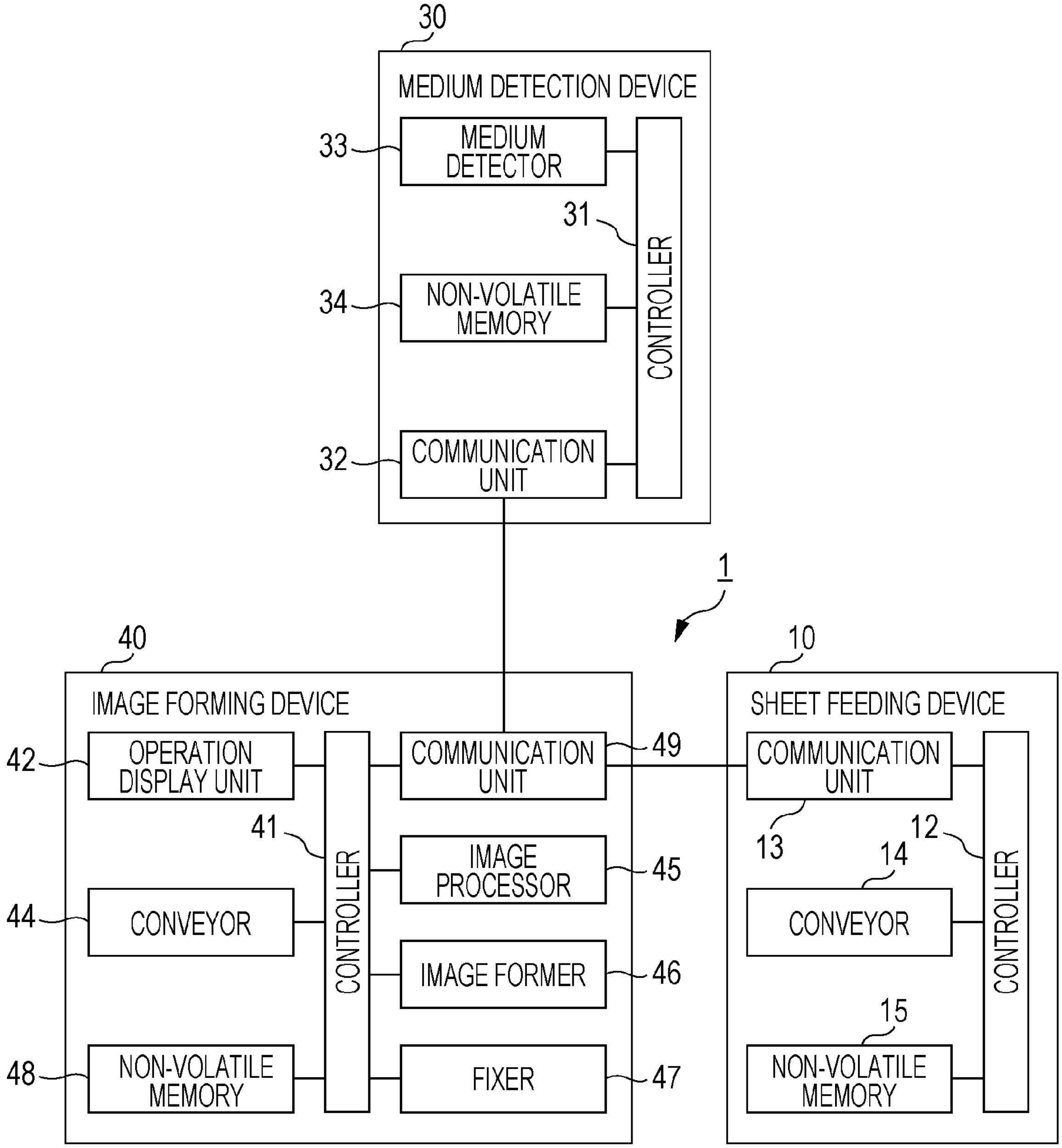
FIG. 2 is a block diagram illustrating a configuration example of the image forming system.

Next, a block diagram of a configuration example of the image forming system 1 is illustrated in FIG. 2. FIG. 2 illustrates configurations of the sheet feeding device 10, the medium detection device 30, and the image forming device 40 that are main configurations of one or more embodiments as the image forming system 1, in which configurations of the supply adjuster 20, the recovery adjuster 50, and the recovery device 60 are not illustrated.

As illustrated in FIG. 2, the image forming device 40 is provided with the controller 41, the operation display unit 42, the conveyor 44, the image processor 45, the image former 46, the fixer 47, a non-volatile memory 48, and a communication unit 49. The sheet feeding device 10 is provided with a controller 12, a communication unit 13, a conveyor 14, and a non-volatile memory 15. The medium detection device 30 is provided with a controller 31, a communication unit 32, a medium detector 33, and a non-volatile memory 34.

The controller 12 of the sheet feeding device 10 is formed of a central processing unit (CPU), a random access memory (RAM), a read only memory (ROM) and the like not illustrated, for example. The CPU of the controller 12 reads various processing programs stored in the ROM, develops the same in the RAM, and comprehensively controls operations of respective units of the sheet feeding device 10 such as the communication unit 13, the conveyor 14, and the non-volatile memory 15 connected via a system bus (not illustrated) of the sheet feeding device 10 according to the developed programs.

The non-volatile memory 15 stores the programs and the like executed by the controller 12, and is used as a work area of the controller 12.

The communication unit 13 transmits and receives data to and from the communication unit 49 of the image forming device 40 forming the image forming system 1. The communication unit 13 transmits and receives data to and from the communication unit 32 of the medium detection device 30 and communication units of the supply adjuster 20, the recovery adjuster 50, the recovery device 60 and the like not illustrated via the communication unit 49 of the image forming device 40.

The conveyor 14 feeds the recording material S stored in the sheet feeding device 10 to convey, and feeds the same to the image forming device 40.

The recovery device 60 may also have a configuration similar to that of the sheet feeding device 10 described above.

The controller 41 of the image forming device 40 is formed of a central processing unit (CPU), a random access memory (RAM), a read only memory (ROM) and the like not illustrated, for example. The CPU of the controller 41 reads various processing programs stored in the ROM, develops the same in the RAM, and comprehensively controls operations of respective units of the image forming device 40 such as the operation display unit 42, the conveyor 44, the image processor 45, the image former 46, the fixer 47, the non-volatile memory 48, and the communication unit 49 connected via a system bus of the image forming device 40 according to the developed programs.

The controller 41 controls the sheet feeding device 10 and the medium detection device 30 via the communication unit 49.

The non-volatile memory 48 stores the programs and the like executed by the controller 41, and is used as a work area of the controller 41. The non-volatile memory 48 stores recording material information and the like including an image forming condition set in the image forming job, the size and type of the recording material S and the like. The non-volatile memory 48 further stores information of the recording material characteristic detected by the medium detection device 30 and the like. Examples of the stored image forming condition include an execution condition in the image former 46 and an execution condition in the fixer 47 (fixing target temperature, pressure and the like), for example.

The communication unit 49 of the image forming device 40 transmits and receives data to and from the communication unit 13 of the sheet feeding device 10 and the communication unit 32 of the medium detection device 30. The communication unit 49 transmits and receives data to and from each communication unit of the supply adjuster 20, the recovery adjuster 50, the recovery device 60 and the like not illustrated.

The image processor 45 obtains the image data from the input job information and performs the image processing. The image processor 45 performs the image processing such as shading correction, image density adjustment, and image compression on the obtained image data as necessary under the control of the controller 41. The image data processed by the image processor 45 is transmitted to the image former 46.

The conveyor 44 conveys the recording material S fed from the sheet feeding device 10 to the image former 46, the fixer 47 and the like under the control of the controller 41.

The image former 46 receives the image data on which the image processing is performed by the image processor 45 and forms an image on the recording material S conveyed to the image former 46 by the conveyor 44 on the basis of the image data.

The operation display unit 42 includes a display unit formed of a display such as a liquid crystal display device, and an operation unit formed of a touch panel, a plurality of keys and the like provided so as to overlap the display. The operation display unit 42 being an example of the display unit and the operation unit displays an instruction menu for a user, information regarding the obtained image data and the like. The operation display unit 42 further receives an input of various instructions and data such as letters and numbers by a user's operation and outputs an input signal to the controller 41.

The controller 31 of the medium detection device 30 is formed of a central processing unit (CPU), a random access memory (RAM), a read only memory (ROM) and the like not illustrated, for example. The CPU of the controller 31 reads various processing programs stored in the ROM, develops the same in the RAM, and comprehensively controls operations of respective units such as the communication unit 32 and the medium detector 33 connected via the system bus of the medium detection device 30 according to the developed programs.

The medium detector 33 includes an optical sensor, a mechanical sensor and the like, and detects the recording material characteristic of the recording material S that passes through the conveyance path of the sheet feeding device 10 and the conveyance path of the image forming device 40 under the control of the controller 31. The information of the recording material characteristic detected by the medium detector 33 is stored in the non-volatile memory 34.

The communication unit 32 of the medium detection device 30 transmits and receives data to and from the communication unit 49 of the image forming device 40 forming the image forming system 1. For example, the communication unit 32 transmits the information of the recording material characteristic stored in the non-volatile memory 34 to the communication unit 49 of the image forming device 40. The communication unit 32 transmits and receives data to and from the communication unit 13 of the sheet feeding device 10 and communication units of the supply adjuster 20, the recovery adjuster 50, the recovery device 60 and the like not illustrated via the communication unit 49 of the image forming device 40.

[Configuration of Controller]

Figure 3:
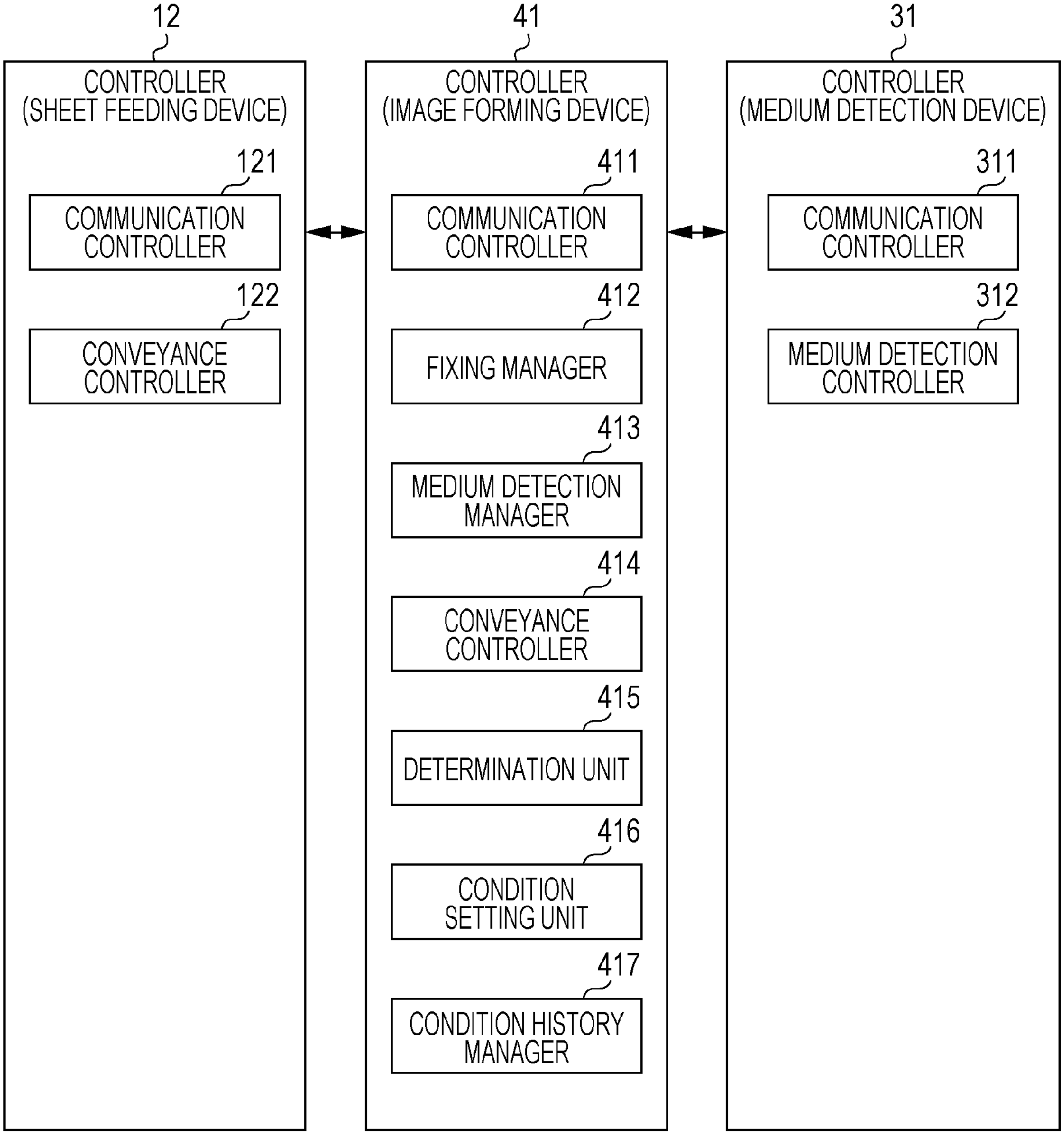
FIG. 3 is a functional block diagram of a controller of the image forming system.

Next, functional configurations of the controller 12 of the sheet feeding device 10, the controller 31 of the medium detection device 30, and the controller 41 of the image forming device 40 of the image forming system 1 described above are described. FIG. 3 is a functional block diagram of the controller 12 of the sheet feeding device 10, the controller 31 of the medium detection device 30, and the controller 41 of the image forming device 40.

The controller 12 of the sheet feeding device 10 is provided with a communication controller 121 and a conveyance controller 122. A controller of the recovery device 60 may also have a configuration similar to that of the controller 12 of the sheet feeding device 10.

The controller 31 of the medium detection device 30 is provided with a communication controller 311 and a medium detection controller 312.

The controller 41 of the image forming device 40 is provided with a communication controller 411, a fixing manager 412, a medium detection manager 413, a conveyance controller 414, a determination unit 415, a condition setting unit 416, and a condition history manager 417.

The communication controller 121 of the controller 12 of the sheet feeding device 10 controls transmission and reception of data via the communication unit 13 of the sheet feeding device 10 (FIG. 2). The communication controller 311 of the controller 31 of the medium detection device 30 controls transmission and reception of data via the communication unit 32 of the medium detection device 30 (FIG. 2). The communication controller 411 of the controller 41 of the image forming device 40 controls transmission and reception of data via the communication unit 49 of the image forming device 40 (FIG. 2). The controller 12 of the sheet feeding device 10, the controller 31 of the medium detection device 30, and the controller 41 of the image forming device 40 control mutual communication via the communication units 13, 32, and 49 of the respective devices by the communication controller 121, the communication controller 311, and the communication controller 411, respectively.

The conveyance controller 122 of the controller 12 of the sheet feeding device 10 controls drive of the conveyor 14 of the sheet feeding device 10 to control adjustment of the conveyance speed of the recording material S, start and stop of the conveyance of the recording material S and the like.

The medium detection controller 312 of the controller 31 of the medium detection device 30 controls the detection of the recording material characteristic of the recording material S by the medium detection device 30.

The fixing manager 412 of the controller 41 of the image forming device 40 manages the fixer 47 (FIG. 1); for example, this instructs the fixer 47 to execute a warm-up, controls the temperature of the fixer 47 and the like. For example, the fixing manager 412 controls a turn-on rate of heaters that heat the fixer 47 to control a temperature rising rate (or rising rate of temperature) of the fixer 47 during execution of the warm-up.

The medium detection manager 413 instructs the medium detection device 30 to execute the detection of the recording material characteristic during the execution of the warm-up. On the basis of this instruction, the controller 31 of the medium detection device 30 detects the recording material characteristic of the recording material S by the medium detection controller 312.

The determination unit 415 determines a warm-up state of the fixer 47 on the basis of temperature t of the fixer 47 detected by the temperature sensor of the fixer 47 by comparing the temperature t of the fixer 47 during the execution of the warm-up with a predetermined temperature threshold, for example, a first temperature threshold tA and a second temperature threshold tB (where $tA<tB$). A comparison result between the temperature t of the fixer 47 and a temperature threshold T, for example, $t<tA$, $tA<t<tB$, $t>tB$ and the like are determined.

During the execution of the warm-up, the determination unit 415 compares a time in which the temperature t of the fixer rises to the first temperature threshold tA and the second temperature threshold tB with a detection completion time of the recording material characteristic, and determines whether the temperature rising time of the fixer 47 is equal to or shorter than the temperature detection completion time.

The conveyance controller 414 controls drive of the conveyor 44 of the image forming device 40 to control adjustment of the conveyance speed of the recording material S, start and stop of conveyance of the recording material S and the like. For example, the adjustment of the conveyance speed of the recording material S, the start and stop of the conveyance of the recording material S and the like are controlled on the basis of a determination result of the determination unit 415 described above. This conveyance control is performed in conjunction with the conveyance control in the sheet feeding device 10 and the recovery device 60.

The condition setting unit 416 sets an execution condition of the image formation in the image forming device 40 such as the image forming condition in the image former 46 and an execution condition of fixing processing in the fixer 47 on the basis of the recording material characteristic detected by the medium detection device 30 during the execution of the warm-up.

The condition history manager 417 manages a history of the recording material characteristic detected by the medium detection device 30 during the execution of the warm-up and the execution condition of the image formation set by the condition setting unit 416 in accordance with the characteristic. For example, the condition history manager 417 stores a data table including the history of the recording material characteristic and the execution condition in the non-volatile memory 48 (FIG. 2) and the like.

For example, when the condition setting unit 416 sets the execution condition of the image formation on the basis of the condition of the recording material characteristic obtained from the medium detection device 30, the condition history manager 417 reads the history of the recording material characteristic and the execution condition from the non-volatile memory 48. The condition setting unit 416 selects the execution condition corresponding to the obtained recording material characteristic from the history data read by the condition history manager 417, thereby setting the execution condition of the image formation in the image forming device 40. In a case where the recording material characteristic cannot be obtained in the medium detection device 30, the condition setting unit 416 may select any execution condition from the history data read by the condition history manager 417 and set the execution condition of the image formation in the image forming device 40. For example, the execution condition executed immediately before may be selected from the history data, and this execution condition may be set for image formation in the image forming device 40.

In the description above, the example is described in which the controllers 12, 31, and 41 in the sheet feeding device 10, the medium detection device 30, and the image forming device 40, respectively, perform control in cooperation, but there is no limitation, and these functional configurations may also execute all functions for controlling an entire image forming system 1 in any of the controllers 12, 31, and 41. For example, the controller 41 of the image forming device 40 may control the entire image forming system 1. Similarly, it is also possible to execute the functions of all the controllers for controlling the entire image forming system 1 in the controller 12 of the sheet feeding device 10 and the controller 31 of the medium detection device 30.

[Image Forming Processing and Detection of Recording Material Characteristic]

In the image forming system 1 using the roll-shaped recording material S as illustrated in FIG. 1 mentioned above, the recording material S is continuous from the sheet feeding device 10 through the image former 46 to the recovery device 60. Therefore, in such a configuration, an image forming operation is affected by a decrease in conveyance speed of the recording material or conveyance stop of the recording material S during image forming processing. Therefore, during the image forming processing, it is difficult to accurately detect the recording material characteristic of the recording material S by the medium detection device 30. When the conveyance of the recording material S stops, the fixer 47 also stops. In such a state in which the fixer 47 stops, heating unevenness and the like is likely to occur in the fixer 47, so that an adverse effect is likely to occur in the fixing processing of the fixer 47.

Therefore, in the image forming system 1 of one or more embodiments, the recording material characteristic of the recording material S is detected by the medium detection device 30 during a fixing warm-up of the fixer 47 in the image forming device 40. For example, in a state in which the conveyance of the recording material S stops, when the image forming job is input to the image forming device 40, the fixing manager 412 instructs the fixer 47 to perform the warm-up before the image former 46 starts the image forming operation. At that time, the image formation is not performed, so that the image forming operation is not affected by the conveyance stop of the recording material S or the decrease in conveyance speed. Therefore, it is possible to detect the recording material characteristic of the recording material S by the medium detection device 30 without affecting the image forming operation.

Figure 4:
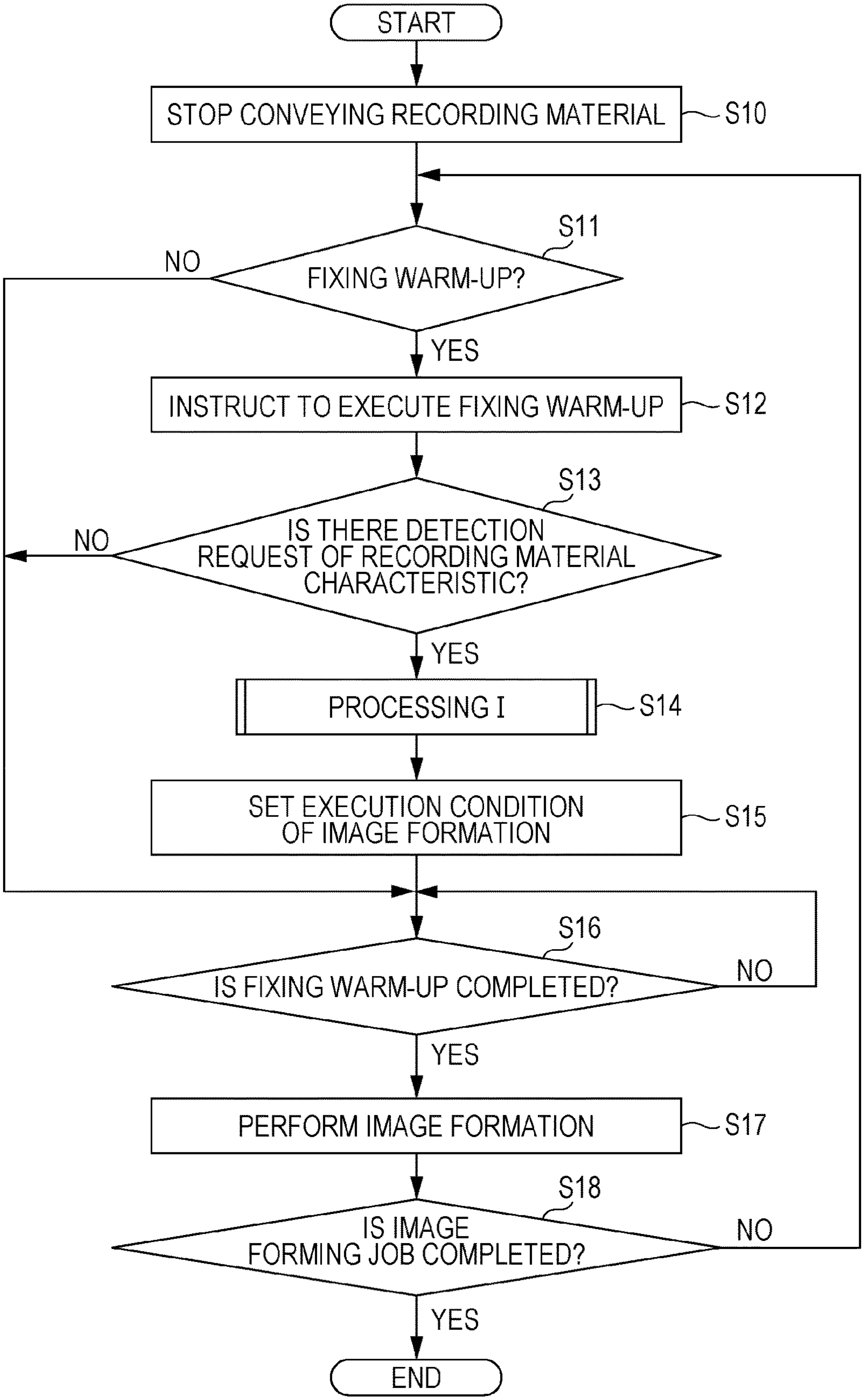
FIG. 4 is a flowchart of image forming processing and processing regarding detection of a recording material characteristic.

FIG. 4 is a flowchart of the image forming processing and processing regarding the detection of the recording material characteristic in the image forming system 1 illustrated in FIG. 1 mentioned above.

First, when the image forming job is input to the image forming device 40, the conveyance controller 122 of the sheet feeding device 10 and the conveyance controller 414 of the image forming device 40 stop conveying the recording material S (step S10). At that time, in the sheet feeding device 10 and the recovery device 60 also, the conveyance controller 122 of the controller 12 similarly stops conveying the recording material S. In a case where the conveyance of the recording material S is already stopped, this processing may be omitted.

Next, the fixing manager 412 determines whether to execute the warm-up of the fixer 47 (step S11). Once the fixing manager 412 determines that the temperature of the fixer 47 is equal to or higher than predetermined fixing temperature (fixing target temperature), it is not necessary to perform the warm-up by the fixer 47. In contrast, upon determining that the temperature of the fixer 47 is lower than the predetermined fixing temperature (fixing target temperature), the fixing manager 412 instructs the fixer 47 to execute the warm-up. The image forming device 40 is configured in advance such that the controller 41 sets the fixing target temperature serving as a reference for determining the execution of the warm-up in the fixer 47 on the basis of, for example, the paper type, an image forming surface, coverage, and other conditions registered as the image forming job.

The fixing temperature when the image formation is actually executed is set according to the recording material characteristic of the recording material S detected by the medium detection device 30 regardless of the fixing target temperature.

Upon determining that the warm-up of the fixer 47 is executed (Yes at step S11), the fixing manager 412 of the controller 41 instructs the fixer 47 to execute the fixing warm-up (step S12).

Next, the medium detection manager 413 determines whether the detection of the recording material characteristic of the recording material S is requested in the image forming job (step S13).

In a case where the detection of the recording material characteristic is requested (Yes at step S13), processing of performing warm-up control and conveyance control according to the temperature of the fixer 47 and detecting the recording material characteristic (hereinafter, referred to as processing I) is performed (step S14). The processing I at step S14 is described later in detail.

Next, the condition setting unit 416 sets the execution condition of the image formation in the image forming device 40 such as the image forming condition in the image former 46 and the execution condition of the fixing processing in the fixer 47 in the image forming job on the basis of the recording material characteristic detected by the processing I (step S15).

After the processing at step S15, upon determining that the warm-up of the fixer 47 is not executed (No at step S11) or upon determining that the detection of the recording material characteristic is not requested (No at step S13), the fixing manager 412 determines whether the warm-up of the fixer 47 is completed (step S16).

In a case where the warm-up of the fixer 47 is not completed (No at step S16), this processing is continued until the warm-up of the fixer 47 is completed.

Upon determining that the warm-up of the fixer 47 is completed (Yes at step S16), the image forming device 40 executes the image formation in the image former 46 according to the execution condition of the image formation set by the condition setting unit 416 (step S17).

Next, the controller 41 of the image forming device 40 determines whether all the image forming jobs are finished (step S18). In a case where an uncompleted image forming job remains (No at step S18), the procedure returns to step S11. In a case where all the image forming jobs are completed (Yes at step S18), the processing according to this flowchart is finished.

(Processing I)

Figure 5:
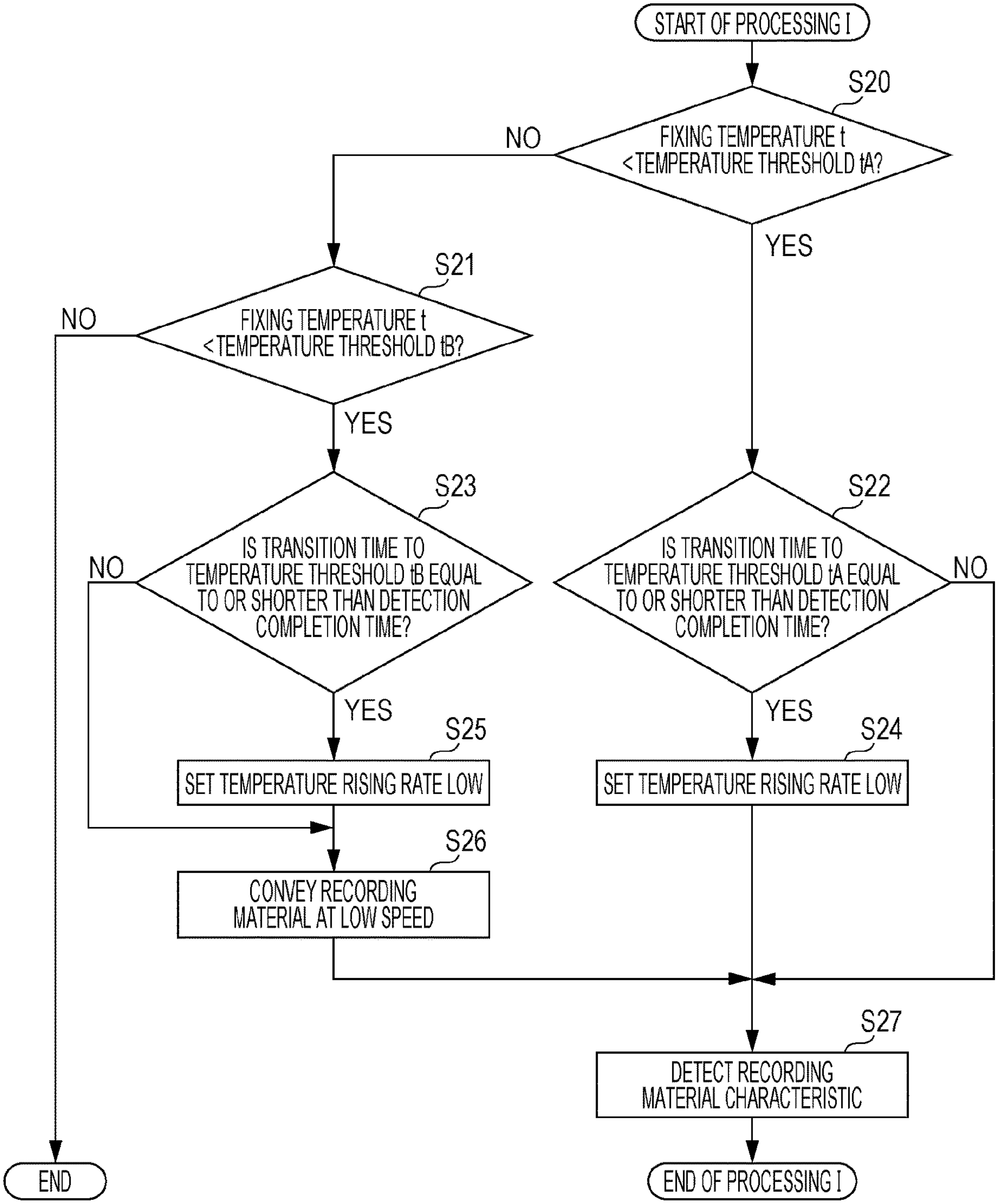
FIG. 5 is a flowchart for describing processing at step S14 of the flowchart illustrated in FIG. 4.

Next, the processing I at step S14 in the flowchart illustrated in FIG. 4 mentioned above is described. A flowchart of the processing I is illustrated in FIG. 5.

First, the determination unit 415 of the controller 41 of the image forming device 40 determines whether the temperature t of the fixer 47 during the warm-up is lower than the first temperature threshold tA (step S20).

Upon determining that the temperature t of the fixer 47 is equal to or higher than the first temperature threshold tA (No at step S20), the determination unit 415 determines whether the temperature t of the fixer 47 during the warm-up is lower than the second temperature threshold tB (step S21). The first temperature threshold tA and the second temperature threshold tB are stored in advance as threshold temperature data in the non-volatile memory 48 and the like of the controller 41 of the image forming device 40. For example, the first temperature threshold tA and the second temperature threshold tB are set on the basis of the paper type, image forming surface, coverage, and other conditions registered as the image forming job, and the data of the threshold temperature stored in advance in the non-volatile memory 48 and the like.

Figure 6:
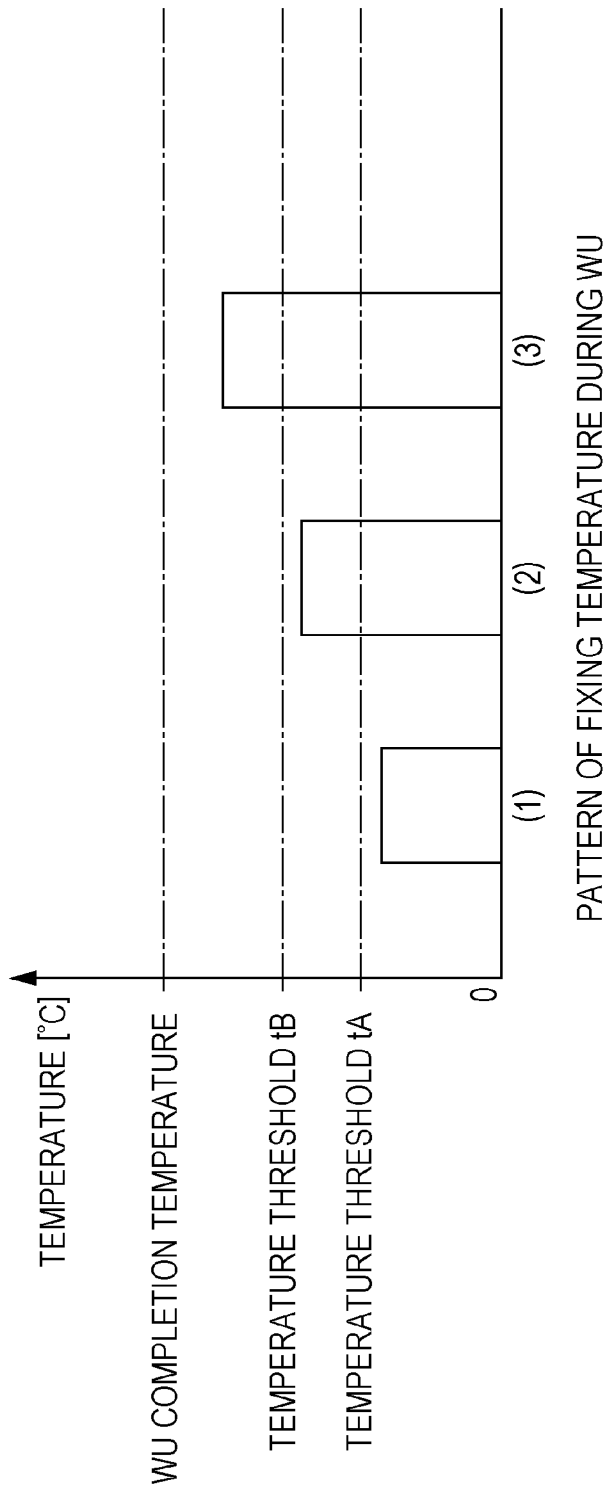
FIG. 6 is a view illustrating a relationship between temperature of a fixer and a temperature threshold.

Here, a relationship between the temperature t of the fixer 47 and the first and second temperature thresholds tA and tB is described. FIG. 6 illustrates the relationship between the temperature t of the fixer 47 and the first and second temperature thresholds tA and tB.

In FIG. 6, the temperature [° C.] is plotted along the ordinate indicating the first temperature threshold tA, the second temperature threshold tB, and warm-up (WU) completion temperature (fixing target temperature). Patterns (1) to (3) of the temperature t of the fixer 47 during the warm-up (WU) are plotted along the abscissa.

The first temperature threshold tA is upper limit temperature at which no damage or defect occurs in the recording material S in a case where the conveyance of the recording material S is stopped in a state of being in contact with the fixer 47.

The second temperature threshold tB is upper limit temperature at which damage or defect occurs in the recording material S in a case where the conveyance of the recording material S is stopped in a state of being in contact with the fixer 47, but no damage or defect occurs in the recording material S in a case where this is conveyed at a lower speed than normal conveyance speed at the time of image forming processing.

The first temperature threshold tA and the second temperature threshold tB are the thresholds set in advance on the basis of an experiment using a plurality of types of recording materials.

That is, when the temperature t of the fixer 47 is lower than the first temperature threshold tA as in the pattern (1) of the temperature t of the fixer 47 during the warm-up illustrated in FIG. 6, the conveyance of the recording material S may be stopped during the warm-up of the fixer 47. Therefore, the medium detection device 30 may detect the recording material characteristic of the recording material S in a state in which the conveyance of the recording material S is stopped in the image forming system 1.

When the temperature t of the fixer 47 is not lower than the first temperature threshold tA and lower than the second temperature threshold tB as in the pattern (2) of the temperature t of the fixer 47 during the warm-up, the recording material S may be conveyed at a lower speed than the normal conveyance speed at the time of image forming processing. Therefore, the medium detection device 30 may detect the recording material characteristic of the recording material S while conveying the recording material S at a speed lower than the normal conveyance speed in the image forming system 1.

In a case where the temperature t of the fixer 47 is equal to or higher than the second temperature threshold tB as in the pattern (3) of the temperature t of the fixer 47 during the warm-up, it is necessary to convey the recording material S at the normal conveyance speed at the time of image forming processing in order to suppress occurrence of damage of the recording material S by the fixer 47 and defect in the fixer 47. Therefore, it is difficult for the medium detection device 30 to correctly detect the recording material characteristic of the recording material S.

Returning to the description of FIG. 5, upon determining that the temperature t of the fixer 47 is lower than the first temperature threshold tA (Yes at step S20), the determination unit 415 compares a time in which the temperature t of the fixer 47 during the warm-up reaches the first temperature threshold tA and the detection completion time of the recording material characteristic, and determines whether a time to reach the first temperature threshold tA is equal to or shorter than the detection completion time (step S22).

Upon determining that the temperature t of the fixer 47 is lower than the second temperature threshold tB (Yes at step S21), the determination unit 415 compares a time in which the temperature t of the fixer 47 during the warm-up reaches the second temperature threshold tB and the detection completion time of the recording material characteristic, and determines whether a time to reach the second temperature threshold tB is equal to or shorter than the detection completion time (step S23).

In a case where the temperature t of the fixer 47 is equal to or higher than the second temperature threshold tB (No at step S21), the image forming job is stopped, and the processing according to this flowchart is finished. A case where the temperature t of the fixer 47 is equal to or higher than the second temperature threshold tB is a state in which the recording material S is damaged or the defect occurs in the fixer 47 when the recording material S is stopped or conveyed at a low speed. Therefore, this is a state in which not only the recording material characteristic cannot be detected but also the image formation cannot be performed, and the image forming job is stopped.

In a case where the temperature t of the fixer 47 becomes equal to or higher than the first threshold temperature tA while the medium detection device 30 detects the recording material characteristic, there is a possibility that the recording material S is damaged or the defect occurs in the fixer 47 in a state in which the conveyance of the recording material S is stopped. In a case where the temperature t of the fixer 47 becomes equal to or higher than the second threshold temperature tB while the medium detection device 30 detects the recording material characteristic, there is a possibility that the recording material S is damaged or the defect occurs in the fixer 47 in a state in which the recording material S is conveyed at a lower speed than the normal conveyance speed. Therefore, before the medium detection device 30 detects the recording material characteristic, it is determined whether the time in which the temperature t of the fixer 47 becomes equal to or higher than the first threshold temperature tA or the second threshold temperature tB is equal to or shorter than the detection completion time of the recording material characteristic of the recording material S.

Upon determining that the time to reach the first temperature threshold tA is equal to or shorter than the detection completion time (Yes at step S22), the fixing manager 412 performs control to decrease the temperature rising rate of the fixer 47 during the warm-up (step S24).

Upon determining that the time to reach the second temperature threshold tB is equal to or shorter than the detection completion time (Yes at step S23), the fixing manager 412 performs control to decrease the temperature rising rate of the fixer 47 during the warm-up (step S25).

Here, the control of the temperature rising rate of the fixer 47 during the warm-up is described. FIGS. 7 to 10 are graphs of a rise in temperature of the fixer 47 during the warm-up. In the graphs illustrated in FIGS. 7 to 10, the temperature t[° C.] of the fixer 47 is plotted along the ordinate, and an elapsed time from the warm-up start (or start of the warm-up) is plotted along the abscissa.

In the graphs illustrated in FIGS. 7 to 10, as an example of the temperature threshold, the first temperature threshold tA is set to 80° C., and the second temperature threshold tB is set to 120° C.

The graphs illustrated in FIGS. 7 to 10 illustrate examples in which the detection of the recording material characteristic of the recording material S is started at the same time as the warm-up start, the examples in which the time until the detection of the recording material characteristic is completed is set to 40 seconds.

Figure 7:
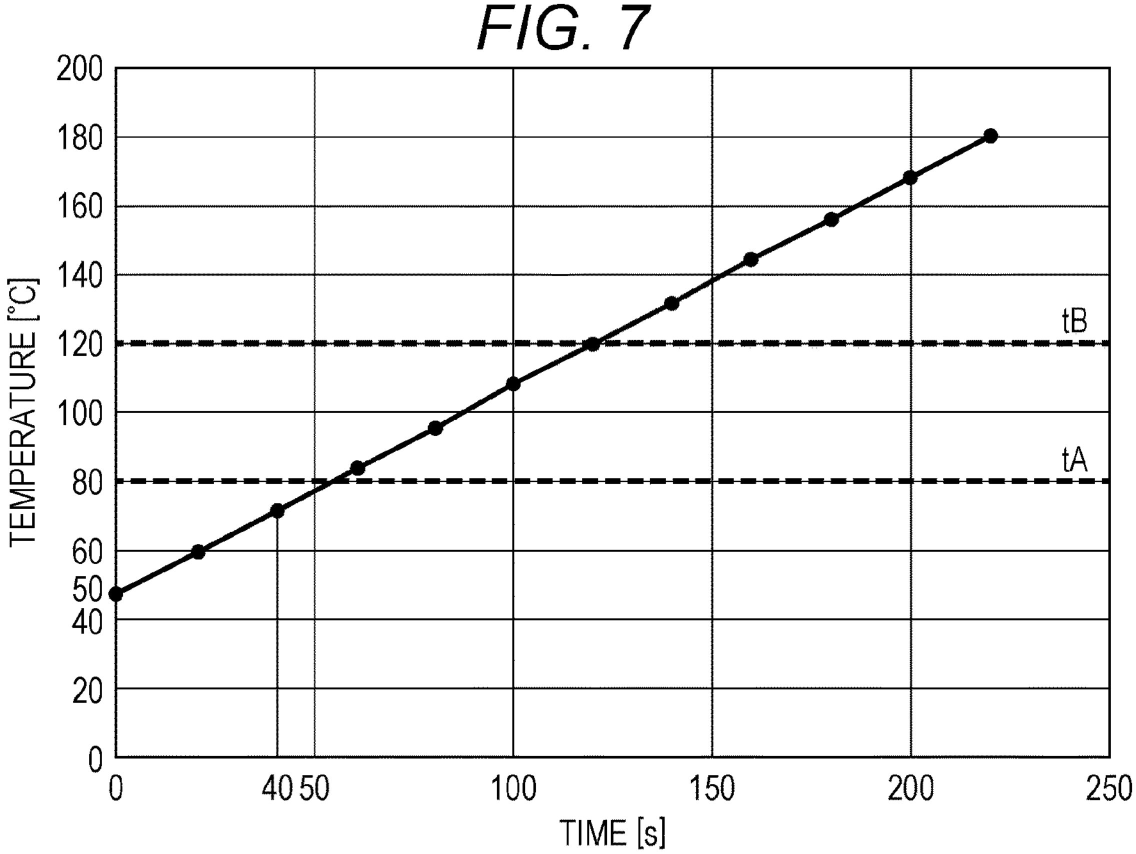
FIG. 7 is a graph of a rise in temperature of the fixer during a warm-up.

FIG. 7 illustrates a case where the temperature t of the fixer 47 when the warm-up is started is 50° C.; even when normal warm-up in which all the heaters are turned on to heat the fixer 47 is performed, the detection of the recording material characteristic is completed before the temperature t of the fixer 47 becomes equal to or higher than the first temperature threshold tA. In this manner, when the temperature of the fixer 47 when the detection of the recording material characteristic of the recording material S is completed is lower than the first temperature threshold tA, it is possible to detect the recording material characteristic of the recording material S in a stopped state without occurrence of damage or defect in the recording material S.

Figure 8:
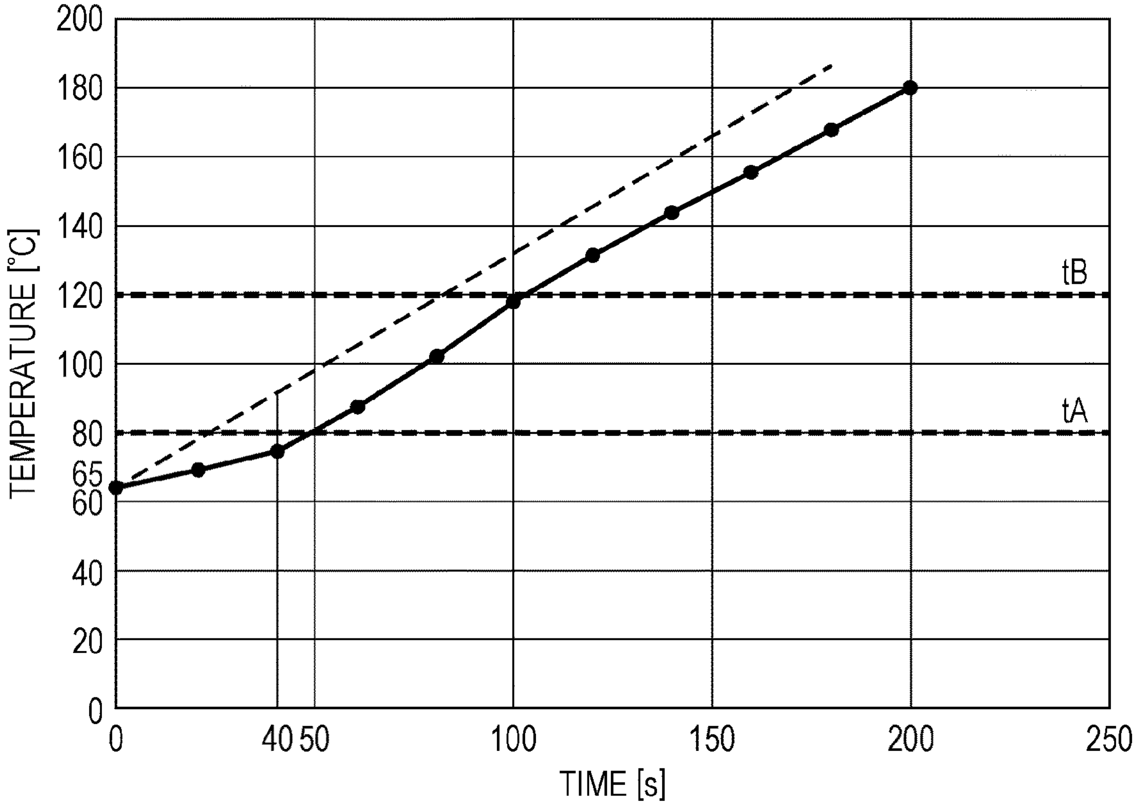
FIG. 8 is a graph of a rise in temperature of the fixer during a warm-up.

In contrast, FIG. 8 illustrates a case where the temperature t of the fixer 47 when the warm-up is started is 65° C. In this case, in a graph of a case where all the heaters are turned on indicated by broken line, the temperature t of the fixer 47 becomes equal to or higher than the first temperature threshold tA before the detection of the recording material characteristic is completed. Therefore, as illustrated in a graph indicated by solid line, the temperature rising rate of the fixer 47 is lowered as compared with that in a case of normal warm-up. Specifically, the temperature rising rate is lowered to that with which the detection of the recording material characteristic is completed before the temperature t of the fixer 47 becomes equal to or higher than the first temperature threshold tA.

In this manner, by lowering the temperature rising rate of the fixer 47 such that the temperature of the fixer 47 when the detection of the recording material characteristic of the recording material S is completed is lower than the first temperature threshold tA, it becomes possible to detect the recording material characteristic of the recording material S in the stopped state without the occurrence of damage or defect in the recording material S.

Figure 9:
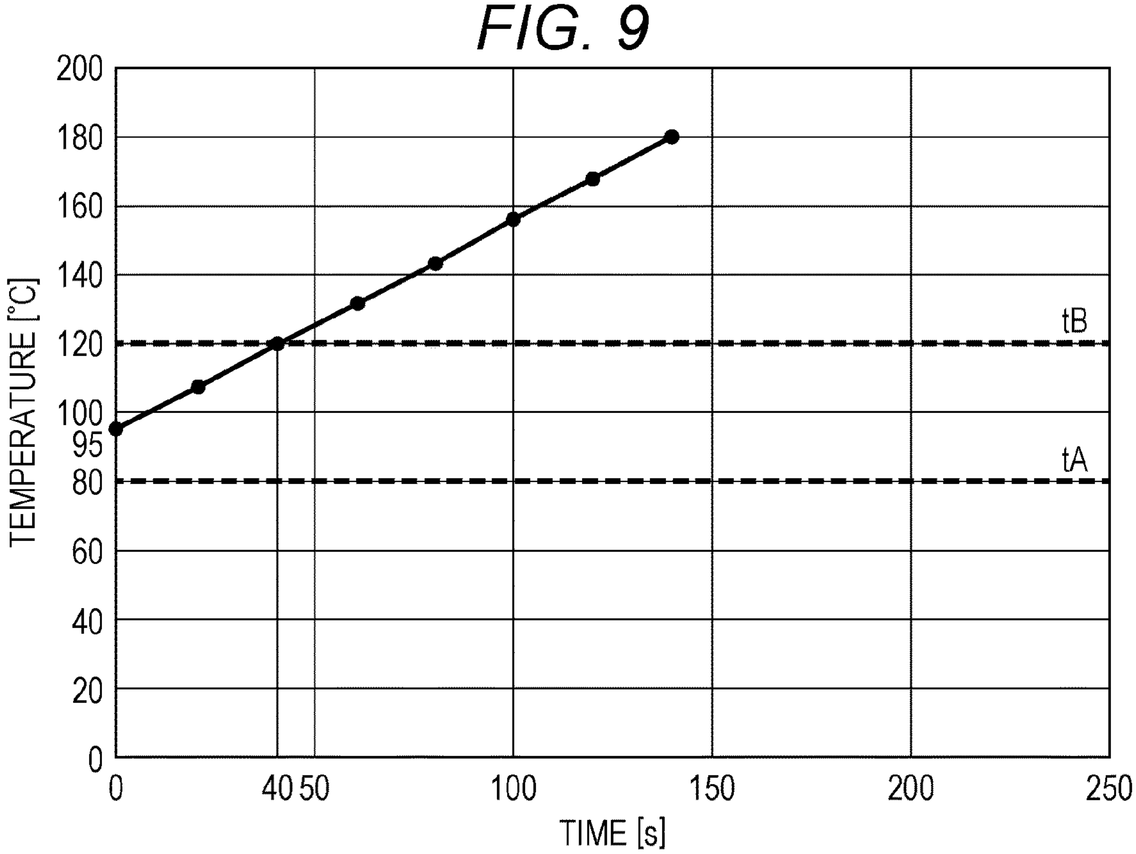
FIG. 9 is a graph of a rise in temperature of the fixer during a warm-up.

FIG. 9 illustrates a case where the temperature t of the fixer 47 when the warm-up is started is 95° C. In this case, the temperature t of the fixer 47 when the warm-up is started is equal to or higher than the first temperature threshold tA. Therefore, the recording material characteristic of the recording material S cannot be detected in the stopped state. However, the temperature t of the fixer 47 when the warm-up is started is lower than the second temperature threshold tB. Even when the normal warm-up in which all the heaters are turned on to heat the fixer 47 is performed, the detection of the recording material characteristic is completed before the temperature t of the fixer 47 becomes equal to or higher than the second temperature threshold tB. In this case, it is not possible to detect the recording material characteristic of the recording material S without the occurrence of damage or defect of the recording material S in a state in which the recording material S is stopped, but it becomes possible to detect the recording material characteristic without the occurrence of damage or defect in the recording material S by conveying the recording material S at the speed lower than the normal speed at the time of image formation (low-speed conveyance).

Figure 10:
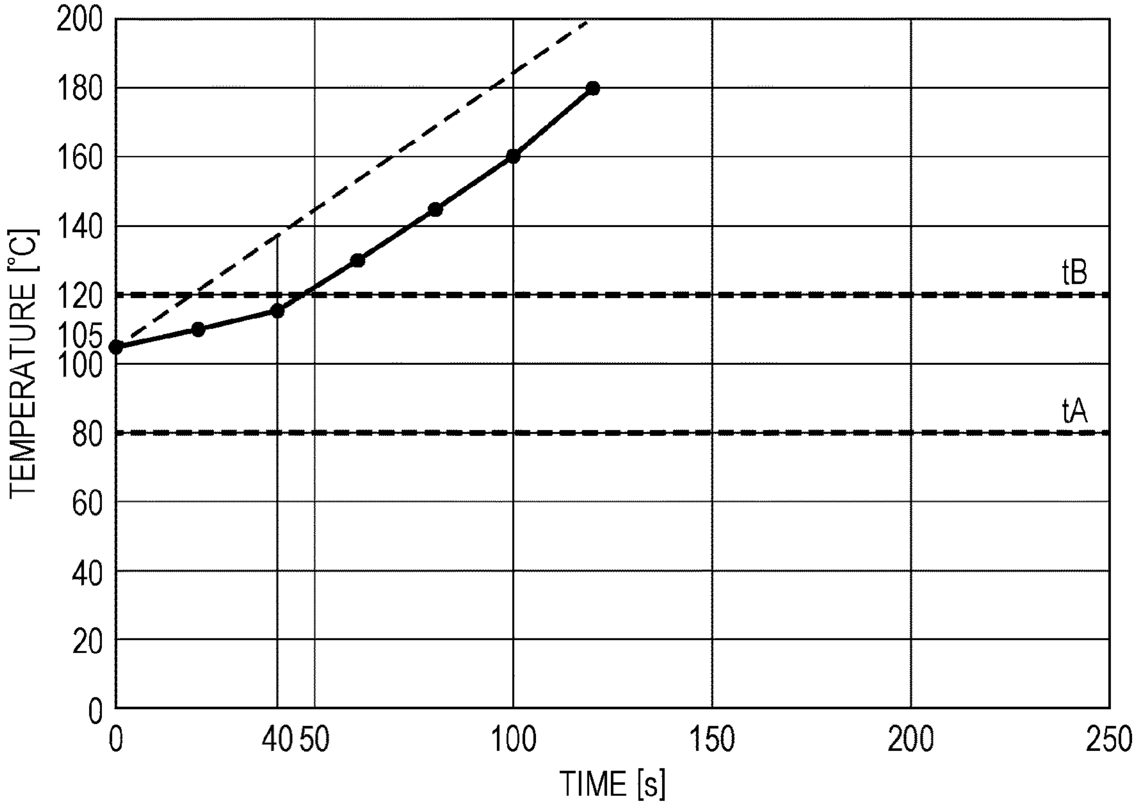
FIG. 10 is a graph of a rise in temperature of the fixer during a warm-up.

In contrast, FIG. 10 illustrates a case where the temperature t of the fixer 47 when the warm-up is started is 105° C. In this case, as in the case illustrated in FIG. 9, the recording material characteristic of the recording material S cannot be detected in the stopped state.

Furthermore, in a graph of a case where all the heaters are turned on indicated by broken line, the temperature t of the fixer 47 becomes equal to or higher than the second temperature threshold tB before the detection of the recording material characteristic is completed. Therefore, even when the recording material S is conveyed at a low speed as in the case in FIG. 9, the damage or defect occurs in the recording material S due to the detection of the recording material characteristic. Therefore, in the example illustrated in FIG. 10, as in a graph indicated by solid line, the temperature rising rate of the fixer 47 is lowered as compared with that in the normal warm-up. Specifically, the temperature rising rate is lowered to that with which the detection of the recording material characteristic is completed before the temperature t of the fixer 47 becomes equal to or higher than the second temperature threshold tB.

In this manner, by lowering the temperature rising rate of the fixer 47 such that the temperature of the fixer 47 when the detection of the recording material characteristic of the recording material S is completed is lower than the second temperature threshold tB, it becomes possible to detect the recording material characteristic by conveying the same at a lower speed than the normal speed at the time of image formation (low-speed conveyance).

In the example illustrated in FIGS. 7 to 10 mentioned above, the recording material characteristic is detected simultaneously with the warm-up start, but the recording material characteristic does not need to be detected simultaneously with the warm-up. The detection of the recording material characteristic may be started within a predetermined time period from the warm-up start such that the detection of the recording material characteristic is finished by the completion of the warm-up. Therefore, although comparison determination between the first temperature threshold tA and the second temperature threshold tB is performed on the basis of the temperature t of the fixer 47 when the warm-up is started in the description above, the above-described comparison determination may be performed on the basis of the temperature t of the fixer 47 within a predetermined time period from the warm-up start.

The adjustment of the temperature rising rate of the fixer 47 and the adjustment of the time to reach the temperature threshold of the temperature t of the fixer 47 may be performed, for example, by adjusting a ratio between turn-on time/turn-off time of the heater (adjusting a duty ratio), adjusting the number of heaters turned on and the like in the fixing manager 412.

The adjustment of the temperature rising rate by the fixing manager 412 may be obtained by, for example, a temperature difference between the temperature t of the fixer 47 and the first temperature threshold tA or the second temperature threshold tB, a detection time of the recording material characteristic and the like.

In this manner, the temperature rising rate of the fixer 47 during the warm-up is adjusted such that the time to reach the threshold temperature of the temperature t of the fixer 47 is equal to or longer than the detection completion time of the recording material characteristic in the medium detection device 30. As a result, the fixing manager 412 adjusts the time at which the temperature t of the fixer 47 reaches the threshold temperature so as to be later than the detection completion time of the recording material characteristic. As a result, it becomes possible to suppress the occurrence of damage to the recording material S and defect in the fixer 47 and to detect the recording material characteristic with high accuracy.

In a case where the temperature rising rate of the temperature t of the fixer 47 is adjusted at step S24 or step S25, the temperature rising rate of the temperature t of the fixer 47 may be returned to the state similar to that of the normal warm-up as illustrated in FIGS. 8 and 10 after finishing the detection of the recording material characteristic. By returning the increasing rate of the fixing temperature to the state before adjustment by the fixing manager 412, it is possible to minimize a delay in the completion time of the warm-up of the fixer 47 and a delay in the start time of the image forming job, and to suppress a decrease in productivity.

Returning to the description of FIG. 5, upon determining that the time to reach the second temperature threshold tB is longer than the detection completion time (No at step S23), or after the processing at step S25, the conveyance controller 122 of the sheet feeding device 10 and the conveyance controller 414 of the image forming device 40 execute the conveyance of the recording material S at a speed lower than the normal conveyance speed (step S26). The conveyance controller 122 and the conveyance controller 414 start the conveyance of the recording material S at the conveyance speed at which the recording material characteristic may be detected with high accuracy in the medium detection device 30, and the damage to the recording material S in the fixer 47 and the defect in the fixer 47 are less likely to occur.

In a case where the time to reach the first temperature threshold to is longer than the detection completion time (No at step S22), after the processing at step S24 or after the processing at step S26, the detection of the recording material characteristic is executed in the medium detection device 30 (step S27). After the recording material characteristic is detected, the processing according to this flowchart is finished, and the above-described processing I is finished.

According to the processing illustrated in FIGS. 4 and 5 mentioned above, by detecting the recording material characteristic of the recording material S during the warm-up of the fixer 47 in which the image formation is not performed, it becomes possible to detect the recording material characteristic with high accuracy by stopping the conveyance of the recording material S or lowering the conveyance speed. Furthermore, by adjusting the conveyance state of the recording material S according to the temperature t of the fixer 47, it becomes possible to suppress the damage and defect of the recording material S to detect the recording material characteristic with high accuracy. By detecting the recording material characteristic of the recording material S during the warm-up of the fixer 47 in which the image formation is not performed, it is possible to suppress a decrease in productivity.

The present invention is not limited to the configuration described in the above-described embodiments, and various modifications and changes may be made without departing from the configuration of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming system comprising:

a conveyor that conveys a recording material along a conveyance path;

a detector that is disposed on the conveyance path and detects a characteristic of the recording material;

a fixer that fixes a toner image formed on the recording material; and a hardware processor that:

causes the detector to detect the characteristic during a warm-up of the fixer with respect to an image forming job, based on the characteristic detected by the detector, sets an image forming condition in the image forming job, and stores a data table indicating a history of the image forming condition corresponding to the characteristic detected during the warm-up, and in a case that the detector cannot detect the characteristic during the warm-up, reads out the history from the data table and sets the image forming condition based on the history.

2. An image forming system comprising:

a conveyor that conveys a recording material along a conveyance path;

a detector that is disposed on the conveyance path and detects a characteristic of the recording material;

a fixer that fixes a toner image formed on the recording material; and a hardware processor that:

causes the detector to detect the characteristic during a warm-up of the fixer with respect to an image forming job, based on the characteristic, sets an image forming condition in the image forming job, and controls, based on a temperature of the fixer within a predetermined time period from a start of the warm-up, a rising rate of the temperature of the fixer within a time period in which the detector detects the characteristic during the warm-up.

3. The image forming system according to claim 2, wherein the hardware processor:

upon determining that the temperature of the fixer within the predetermined time period is lower than a first temperature threshold, determines whether a time period until the temperature of the fixer rises to the first temperature threshold is equal to or shorter than a detection completion time of the characteristic, and upon determining that the time period is equal to or shorter than the detection completion time, sets the rising rate of the temperature to be lower than a predetermined rising rate at least in the time period in which the detector detects the characteristic.

4. The image forming system according to claim 2, wherein the hardware processor:

upon determining that the temperature of the fixer within the predetermined time period is equal to or higher than a first temperature threshold and lower than a second temperature threshold, determines whether a time period until the temperature of the fixer rises to the second temperature threshold is equal to or shorter than a detection completion time of the characteristic, and upon determining that the time period is equal to or shorter than the detection completion time, sets the rising rate of the temperature to be lower than a predetermined rising rate and causes the conveyor to convey the recording material at a conveyance speed lower than a conveyance speed at the time of image formation, at least in the time period in which the detector detects the characteristic.

5. The image forming system according to claim 2, wherein the hardware processor controls the rising rate of the temperature by controlling a turn-on rate of a heater that heats the fixer.

6. The image forming system according to claim 3, wherein the hardware processor returns the rising rate of the temperature to the predetermined rising rate after finishing detection of the characteristic.

7. An image forming system comprising:

a conveyor that conveys a recording material along a conveyance path;

a detector that is disposed on the conveyance path and detects a characteristic of the recording material;

a fixer that fixes a toner image formed on the recording material; and a hardware processor that:

causes the detector to detect the characteristic during a warm-up of the fixer with respect to an image forming job, based on the characteristic, sets an image forming condition in the image forming job, and determines, based on a comparison result between a predetermined temperature threshold and the temperature of the fixer within a predetermined time period from a start of the warm-up, whether to stop or convey the recording material in a time period in which the detector detects the characteristic.

8. The image forming system according to claim 7, wherein upon determining that the temperature of the fixer within the predetermined time period is lower than a first temperature threshold, the hardware processor causes the conveyor to stop conveying the recording material at least in the time period in which the detector detects the characteristic.

9. The image forming system according to claim 7, wherein upon determining that the temperature of the fixer within the predetermined time period is equal to or higher than a first temperature threshold, the hardware processor sets a conveyance speed of the recording material to be lower than a conveyance speed at the time of image formation at least in the time period in which the detector detects the characteristic.

10. The image forming system according to claim 1, wherein the recording material is continuous paper.

11. The image forming system according to claim 10, wherein the recording material is continuous paper wound into a roll shape.

12. The image forming system according to claim 1, comprising:

an image former that forms the toner image on the recording material, wherein the hardware processor sets, as the image forming condition, an execution condition of at least one of the image former and the fixer based on the characteristic detected during the warm-up.

13. The image forming system according to claim 12, wherein the execution condition of the fixer includes a fixing target temperature.

14. The image forming system according to claim 12, wherein the detector is disposed upstream of the image former on a path of the recording material.

15. The image forming system according to claim 12, wherein the detector is disposed between a feeder of the recording material and the image former.

16. The image forming system according to claim 15, comprising:

a feed adjuster that is disposed between the feeder and the image former and adjusts a feed of the recording material, wherein the detector is disposed between the feeder and the feed adjuster.

* * * * *